Oct. 17, 1939.   J. W. MORSE   2,176,269
BALANCE TESTER
Filed Aug. 10, 1936    3 Sheets-Sheet 2

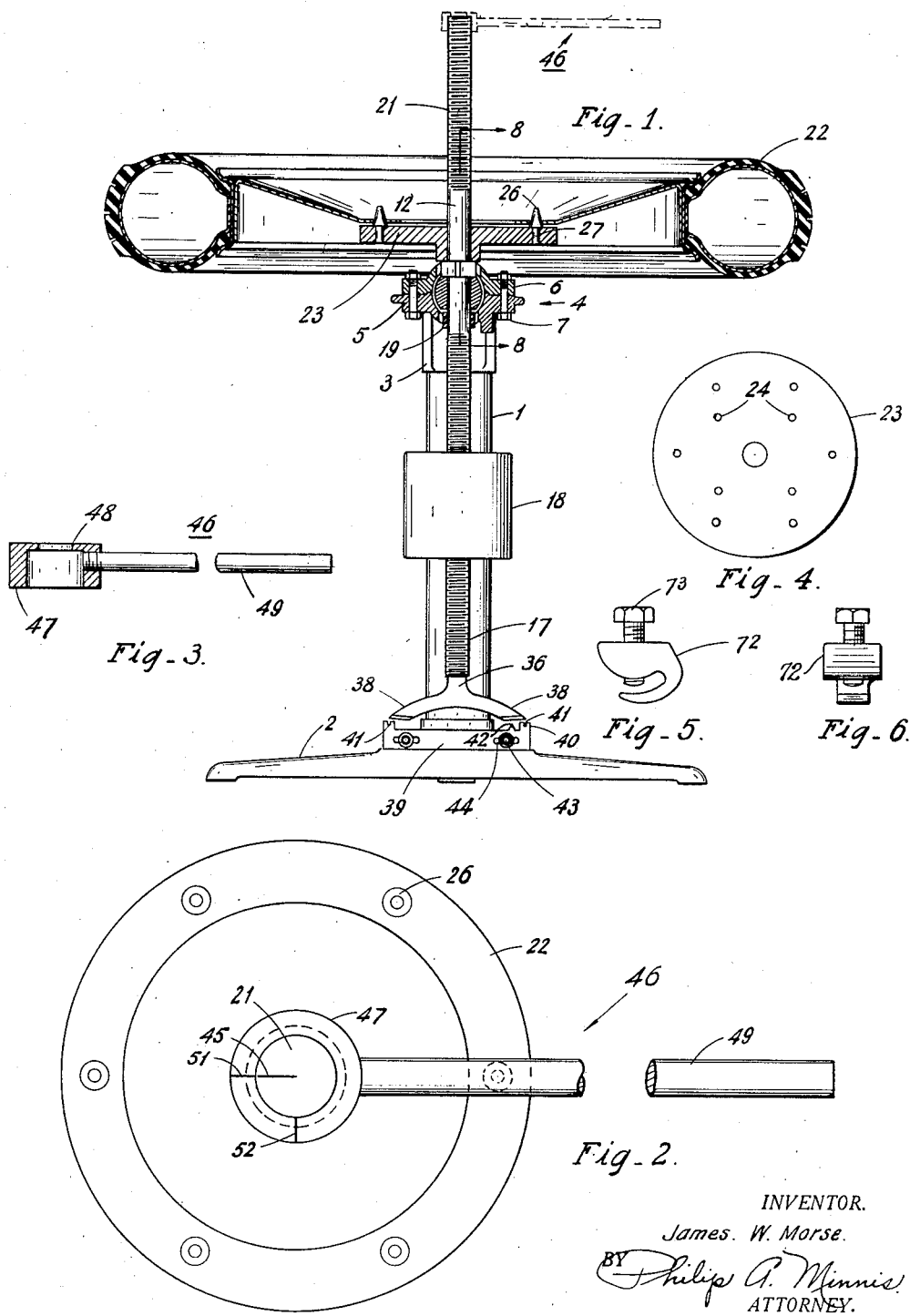

INVENTOR.
James W. Morse.
BY Philip A. Minnis
ATTORNEY

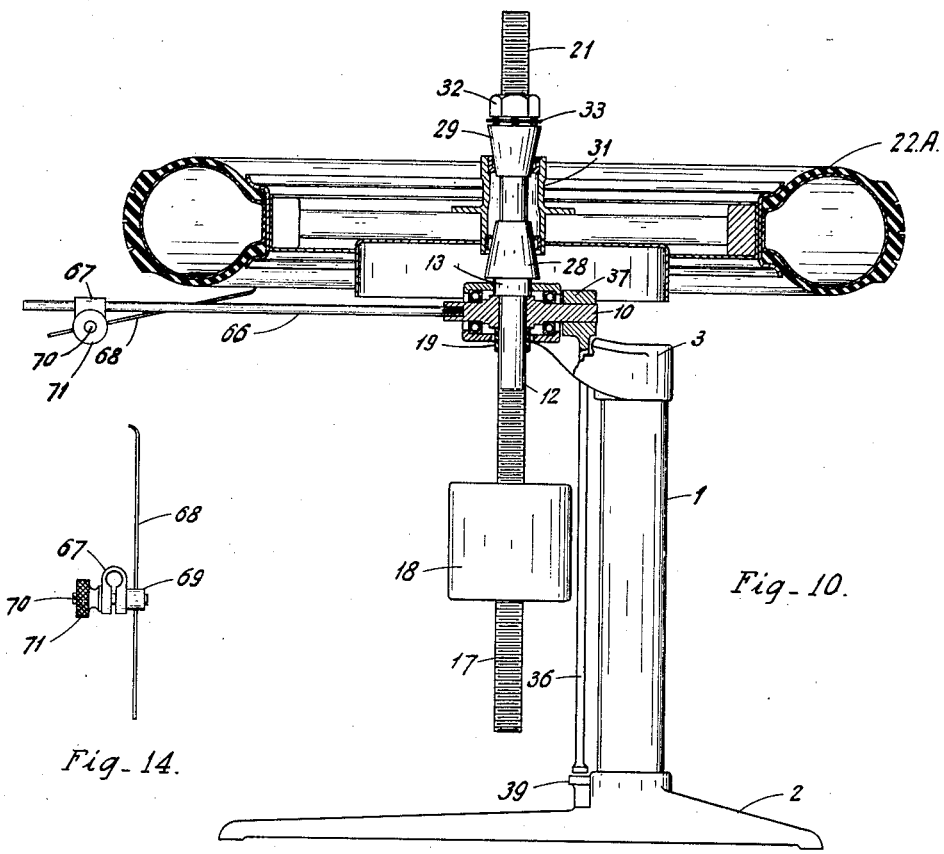
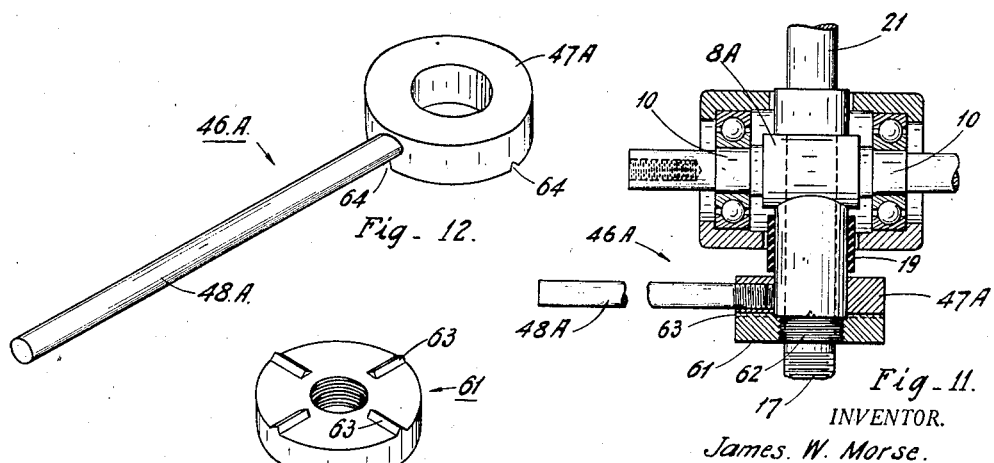

Patented Oct. 17, 1939

2,176,269

UNITED STATES PATENT OFFICE 2,176,269

BALANCE TESTER

James W. Morse, Lansing, Mich., assignor to Food Machinery Corporation, San Jose, Calif., a corporation of Delaware Application August 10, 1936, Serial No. 95,079

7 Claims. (Cl. 73—51)

My invention relates to methods and means for determining and correcting static unbalance of automotive vehicle wheels, and the like, and constitutes an improvement in the Methods and means for wheel balancing as disclosed in my co-pending application, Serial No. 725,422, filed May 14, 1934.

As pointed out in my previous application referred to, it is well known to those familiar with the art, that automotive vehicle wheels intended to be used in the usual high speed transportation of the present day, must be well balanced as regards the distribution of their mass with reference to their axis of rotation, in order to prevent undesirable stresses on spindles and axles, wheel "shimmy", and the like. It is customary, therefore, for such wheel to be carefully balanced originally at the factory, and it frequently becomes necessary to re-balance them from time to time as may be required because of tire replacement and wheel repair, or other conditions which may throw them out of balance.

The improved method and apparatus disclosed herein provides for calibration of the apparatus in a simple and speedy manner to a uniform sensitivity for wheels of various sizes and weights. Thus, the amount of unbalance, if any, can be indicated directly in inch ounces. These improvements result in speedy and accurate work by both skilled and unskilled operators, and in correction of each wheel within the same limits of accuracy. Further, in those instances where a small selected amount of unbalance is permissible, any wheels which do not require balancing are selected readily without unnecessary waste of time.

It is accordingly the general object of my invention to provide an improved method and apparatus for practical testing and correction of vehicle wheels for unbalance.

Another object of my invention is to provide a method of and apparatus for testing and correcting the unbalance of wheels, and which provide for calibration of the apparatus to obtain uniform sensitivity with wheels of various weights and sizes.

Another object of my invention is to provide improved method and means for calibrating a balance tester to obtain uniform sensitivity with wheels of various weights and sizes.

Further objects of my invention will become apparent as the specification proceeds, first with reference to the accompanying drawings of a preferred form of apparatus and then a brief description and explanation of the method as it may be carried out with the assistance of the apparatus.

In the drawings:

Fig. 1 is a sectional front elevation of a balance testing and correcting apparatus illustrated in normal position with a wheel mounted in testing position in symmetrical relation thereto, one position of the calibrating bar being shown in dotted lines;

Fig. 2 is an enlarged fragmentary plan view of a part of the apparatus shown in Fig. 1, showing the removable calibrating bar in place;

Fig. 3 is a partial sectional view of the calibrating bar used to calibrate the apparatus to a uniform sensitivity for various sizes and weights of wheels;

Fig. 4 is a plan view of an adapter plate for mounting disc type wheels on the apparatus;

Figs. 5 and 6 show the construction of balancing weights such as may be applied to the wheel to balance the same;

Fig. 10 is a sectional side elevation of the apparatus taken at right angles to that of Fig. 1; but illustrating an alternative manner of mounting a different type of automobile wheel in testing position.

Fig. 11 is an enlarged fragmentary sectional view similar to Figs. 8 and 10, but illustrating a modified form of the apparatus;

Fig. 12 is an isometric view of the calibrating bar employed with the modification shown in Fig. 11;

Fig. 13 is a view of a calibrating collar which cooperates with the calibrating bar shown in Fig. 12; and Fig. 14 is a detailed view of a run-out gauge.

Generally, the apparatus includes an arbor or the like for receiving a wheel to be tested and which is mounted for pivotal movement about a horizontal axis in response to unbalance of a wheel. With such arbor is associated an adjustable counterpoise for varying the sensitivity of the tester, and means for indicating the amount of unbalance, together with a calibrating bar or adapter for imposing a standard unbalance on the tester to enable calibration thereof. The apparatus can be used both in carrying out the preliminary step of tester calibration, and the final step of testing and correcting unbalance.

Figure 7:
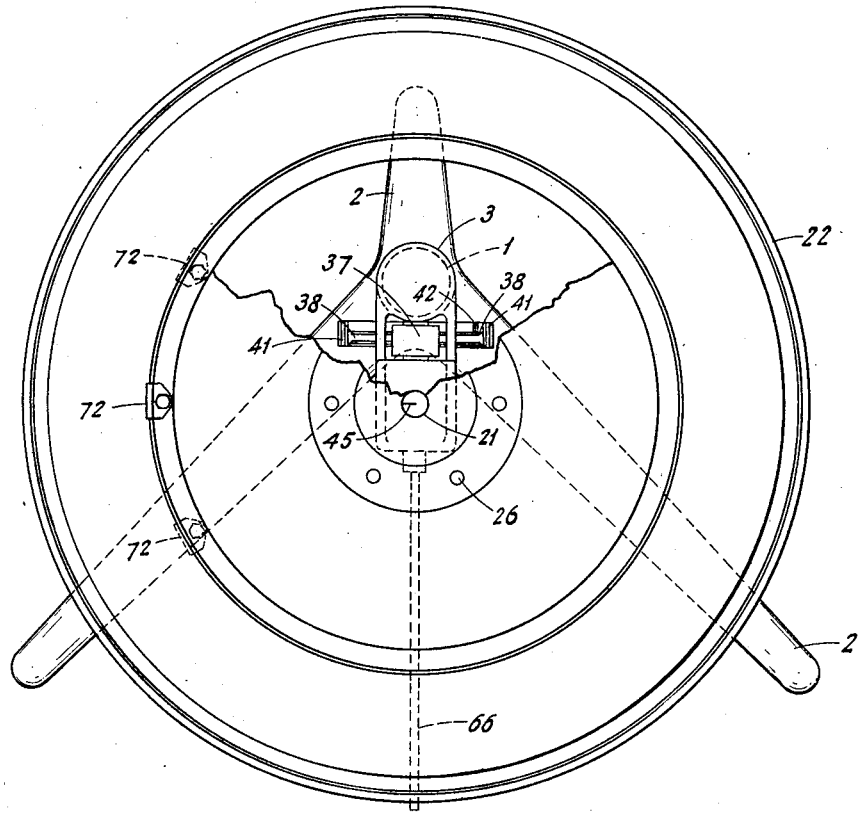
Fig. 7 is a plan view of the apparatus of Fig. 1 with parts broken away to show certain features below the wheel.
Figure 8:
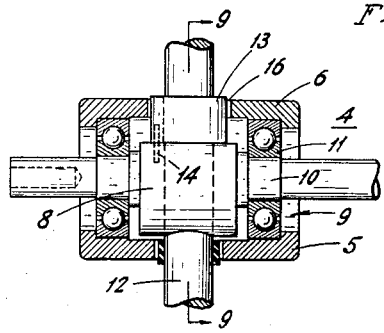
Fig. 8 is a sectional view taken in the plane of the line 8—8 in Fig. 1.
Figure 9:
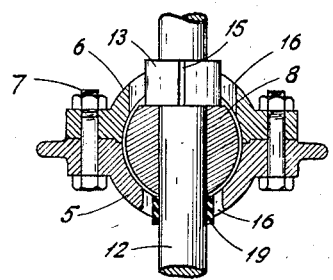
Fig. 9 is a sectional view taken in the plane of line 9—9 of Fig. 8; the section is similar to a part of Fig. 1.

As illustrated in Figs. 1, 7 and 10, the apparatus includes vertical supporting standard 1 mounted on base or pedestal 2, and carrying at its upper end overhanging bracket 3 which supports a split journal housing generally indicated at 4. Housing 4, (Figs. 1, 8 and 9) includes lower section 5 which is preferably formed integral with bracket 3 and separable cover section 6 removably secured to lower section 5 as by bolts 7.

Disposed within journal housing 4 (Figs. 8 and 9), is hub 8 rotatably journalled in ball bearings 9 by means of trunnions 10 provided with grooved rings 11 which cooperate with complementary grooved rings carried by housing 4 to form raceways for the ball bearings.

A normally vertical shaft generally indicated at 12 (Figs. 1 and 10) is pivotally supported intermediate its length for swinging movement about a horizontal axis by means of housing 4 and hub 8 through which shaft 12 freely projects, and is supported in position by annular shoulder 13 (Figs. 8 and 9) formed integral with shaft 12 and resting on hub 8. To prevent relative rotation between shaft 12 and hub 8, pin 14 seated in hub 8 engages in vertical slot 15 formed in shoulder 13. Upper and lower sections 5 and 6 of housing 4 are provided with transversely extending slotted openings 16 to permit shaft 12 to project therethrough and to have swinging motion on hub 8. To prevent injury to the parts, a rubber sleeve or bumper 19 is placed on shaft 12 within the lower opening 16 of housing 4.

Lower portion 17 of shaft 12 projecting downwardly from hub 4 forms a pendulum section which acts as a stabilizer for normally positioning shaft 12 in vertical position. For a purpose later described, cylindrical counterpoise 18 is mounted on lower shaft section 17 for adjustment toward and away from the pivotal point of shaft 12. This may conveniently be accomplished by screw threading shaft 12 and providing counterpoise 18 with an axially tapped bore whereby it can be screwed up and down along the shaft.

Upper portion 21 of shaft 12 projecting upwardly from hub 4 forms an arbor for the axial reception of a wheel or the like, which may be rotatably received thereon for testing. Figs. 1 and 10 illustrate alternate methods of mounting different types of conventional automobile wheels on arbor 21 for testing.

Figs. 1 and 7 illustrate the method of mounting a disc type wheel 22 which has been removed from its hub. For this type of wheel, disc-like adapter plate 23 is provided, which is axially bored so that it can slide over arbor 21 into position to rest upon shoulder 13 of shaft 12. Adapter plate 23 is provided with a series of bored recesses 24 corresponding to the similar holes provided in wheel 22, which is held in place on plate 23 by tapered dowel pins 26 having cylindrical ends 27 for engagement with recesses 24, while the apertures in wheel 22 engage over the tapered ends thereof. It will be understood that while only one adapter plate 23 is necessary for mounting the wheel, it may be desirable to provide several of such plates having different arrangements of recesses 24 to fit the various types of wheels which might be required to be tested.

Where the wheel assembly includes a hub, as in the case of wheel 22A illustrated in Fig. 10, it may be positioned on arbor 21 by means of a pair of centering cones 28 and 29 provided with smooth bores to permit them to slide over arbor 21. In mounting such a wheel for testing, lower cone 28 is slipped over arbor 21 into the position illustrated, where it rests against shoulder 13 of shaft 12. Wheel 22A is then placed in position with its hub 31 fitted over lower centering cone 28, and upper cone 29 is slipped onto arbor 21 into engagement with the upper end of wheel hub 31. Wheel 22A may then be secured lightly in position for rotation about cones 28, 29 and arbor 21, by means of a nut 32 screwed down on arbor 21 either directly against upper cone 29, or with a thrust bearing 33 interposed, if desired.

It will be apparent that if the wheel, after being mounted in testing position as illustrated in Figs. 1 and 10, is unbalanced, shaft 12 will be caused to swing out of the vertical to one side or the other, depending upon which are the light and heavy sides of the wheel. In order to indicate deviation of pendulum shaft 21 from the vertical, indicator arm 36 (Figs. 1, 7 and 10) is provided, which has hub 37 (Fig. 10) at its upper end secured to an extension of one of trunnion shafts 10 for oscillation therewith. Indicator arm 36 projects downwardly from hub 37 thereof behind pendulum shaft 12 as seen in Fig. 1, and parallel therewith. The lower end of indicator arm 36 is forked to provide a pair of pointers or indicators 38, 38 which cooperate with scale device 39 mounted upon pedestal 2.

Scale 39 is provided at its opposite ends with outwardly projecting ears or tabs 40 which, as illustrated, are provided with respective gauge marks or indexes 41 preferably centered with respect to the edges of ears 40 for cooperation with the outer edges of the pointers 38, 38 to indicate positioning of shaft 12 in its normal vertical position. Adjacent one of tabs 40, V-shaped projection 42 provides a calibration reference mark or index for a purpose later described.

Because of the provision of the double pointers 38, 38 readings can readily be taken from either side of the apparatus.

Scale 39 is preferably adjustably mounted on pedestal 2 by means of cap screws 43 passing through slots 44 in scale 39 and engaging suitable tapped recesses in a squared face of pedestal 2. The adjustable mounting of scale 39 makes it unnecessary to level the tester other than in an approximate way, so that the tester may be set up in any convenient place, and any out of level condition may be compensated for simply, by adjusting scale 39 to bring graduations 41 into registration relative to pointers 38 of indicator arm 36.

In order to provide for calibration of the tester as well as to facilitate rapid and accurate manipulation thereof, gauge or indicator means are provided to enable the operator to set a wheel accurately at desired angular positions on the arbor and with respect to the pivotal supporting axis therefor, such means being of special construction to enable calibration of the tester to obtain uniform sensitivity for various sizes and shapes of wheels. For this purpose, in the preferred form of tester shown in Figs. 1 and 2, the upper end of arbor 21 (Fig. 2) is provided with radial index or mark 45 which preferably lies in a plane perpendicular to the pivotal supporting axis of arbor 21. For cooperation with index 45, indicating and calibrating bar or adapter 46 is provided. Bar 46 (Figs. 2 and 3) comprises collar 47 having internal flange 48, and radial rod 49 threaded in collar 47. The aperture in collar 47 is of a size to fit snugly over the upper end of arbor 21 with flange 48 engaged with such end. On the upper surface thereof, collar 47 is provided with radial indexes or marks 51, 52 spaced 90° apart. Index 51 is preferable parallel to rod 49 and index 52 is perpendicular thereto, so that when index 51 is aligned with arbor index 45, bar 46 is perpendicular to the pivotal supporting axis of arbor 21, and, when index 52 is aligned with arbor index 45, bar 46 is parallel to such supporting axis. The reason for such arrangement will be apparent from the description of the use of the tester in carrying out my improved method of testing for and correcting wheel unbalance.

In the modified form shown in Figs. 11 and 13, the indicator or gauge means comprises index collar 61 threaded on the lower end of sleeve extension 62 of hub 8A and having respective pairs of radial knife edge projections or indexes 63 spaced 90° apart on the upper surface thereof. Collar 61 is preferably adjusted on sleeve extension 62 so that one aligned pair of indexes 63 are parallel to the pivotal supporting axis of arbor 21, and the other aligned pair of indexes 63 are perpendicular thereto. For cooperation with indexes 63, calibrating bar 46A is provided comprising collar 47A and radial rod 48A. Collar 47A is provided with four radial V-shaped grooves or indexes 64 spaced 90° apart, one opposite pair of which are parallel to rod 48A and the other opposite pair of which are perpendicular thereto. Thus, by selective engagement of indexes 63 on collar 61, with grooves 64 on collar 47A, rod 48A can be adjusted parallel to or perpendicular to the pivotal supporting axis of arbor 21.

If desired, the tester may be equipped with a gauge to check run-out and eccentricity. Thus, rod 66 (Figs. 7 and 10) may be secured in axial alignment with the pivotal axis of arbor 21, as by being screwed into an end of a trunnion 10, to slidably receive split clamp 67 which carries hooked gauge or scribe 68 in apertured boss 69 thereof. Gauge 68 is held in place by bolt 70 which extends through clamp 67 and has tightening thumb nut 71 threaded thereon.

The operation of the tester will now be described, first in connection with the preliminary calibration of the tester to obtain uniform sensitivity, and thereafter in connection with the correction of unbalance of a wheel.

The method of calibrating the balance tester to a uniform sensitivity with wheels of different sizes and weights, provides for indicating the amount of unbalance in inch ounces with any wheel after calibration of the tester with the wheel mounted thereon.

Calibrating bar 46 is employed to assist in adjusting the sensitivity of the tester, that is in fixing the pendulum deflection per inch ounce at the same value for each wheel tested. This calibrating bar is so designed that, when placed perpendicular to the horizontal trunnion axis as shown in dotted lines in Fig. 1, that is, with its center of mass at its maximum distance from such horizontal axis, it exerts a known moment of say, 30 inch ounces, on the system. It will be clear, however, that this bar may be positioned with its center of mass directly above the horizontal axis, in which position it produces no turning moment on the system, but where its mass is still a part of the system.

The procedure in calibrating the tester to the desired sensitivity for a given wheel, consists in mounting the wheel on the tester either by use of an adapter plate as shown in Fig. 1, or by centering cones as illustrated in Fig. 10. Counterpoise 18 is then adjusted to prevent extreme tilting of pendulum shaft 12 by being screwed up or down pendulum portion 17 thereof until the center of gravity of the wheel and tester assembly is slightly lower than the horizontal rotative axis of the shaft. Thereafter, the wheel is rotated about the arbor axis until pointers 38 are in normal position at marks 41, thus indicating that the center of mass of the wheel lies in the same vertical plane as, and above, the horizontal axis.

Calibrating bar 46 is now positioned as shown in Figs. 1 and 2, with index 51 thereof aligned with arbor index 45, so that bar 46 extends at right angles to the horizontal axis thus placing a 30 inch ounce unbalance on the system and producing a deflection of pointers 38. Counterpoise 18 is now adjusted until the righthand pointer 38 (Fig. 1) overlies calibrating reference index 42. In other words, the center of gravity of the system (tester and wheel) is adjusted vertically until the known moment imposed by calibrating bar 46 effects movement of the indicating means to a fixed selected position.

Bar 46 is now preferably removed, or it may be positioned in no-moment producing position with its center of gravity overlying the horizontal axis by rotating at 90° until index 52 thereof is aligned with arbor index 45. The entire system should now again assume normal position, thus indicating that the foregoing calibration adjustment for uniform sensitivity has been correctly carried out.

From the above description, it is seen that the apparatus can be readily adjusted so that its sensitivity is uniform for all wheels, i. e. so that any deflection of pointers 38 may be read directly in inch ounces, and enables ready determination of the relative amount of unbalance, if any, of a wheel. Obviously, by employing calibrating bars 46 of different weights, the degree of sensitivity of the tester can be adjusted also.

The operation of the modification of Figs. 11–13 in calibrating the tester is obviously substantially the same as that for the Fig. 1 modification, and it is therefore believed that no further explanation of its use is necessary.

To effect correction of the unbalance of a wheel, the wheel is rotated about arbor 21 until the position of indicator arm 36 by registry of pointers 38 with indexes 41 indicates that the pendulum shaft is vertical, thus indicating that the wheel is in balanced position relative to the tester, with its center of gravity lying in the vertical plane containing the horizontal axis of the tester. In this position the outer periphery of the wheel or tire may be marked, as with chalk, at a point directly below bar 46 with index 52 thereof aligned with arbor index 45.

The wheel is then turned through an angle of 90 degrees, this being a simple matter since the operator can quickly place bar 46 to align index 51 thereof with arbor index 45 and turn the wheel so as to position the chalk mark directly below bar 46, after which bar 46 is removed.

In this condition of the parts, the point at which the tire has been marked will be either the light or the heavy side of the wheel, and when rotated through 90 degrees will, accordingly, tip to one side or the other depending upon which is the heavy side, the amount of tilt being indicated by pointers 38.

It may be stated here that while calibrating bar 46 is of considerable assistance for rapid and accurate manipulation of the apparatus, it may be dispensed with of course, if desired, in which event the point of unbalance on the wheel may be determined by rotating the wheel until indicator 38 shows the greatest deflection from the vertical, at which point the heavy and light points of the wheel will be in the plane of movement of the shaft 12.

After positioning the wheel by either of the methods described, the operator may now balance it in any suitable manner. For example, wheel balancing weights 72 such as illustrated in Figs. 5 and 6 may be employed for the purpose. One of these weights may be laid on the wheel adjacent its rim at a point on the light side of the wheel directly in line with the chalk mark on the tire, as shown in full lines in Fig. 7.

If this does not bring the wheel into balance, as indicated by pointers 38, a second weight may be added and the two weights shifted circumferentially around the wheel in opposite directions to positions where they cause the wheel to be balanced, such as indicated in dotted lines on Fig. 7. By deflating the tire the weights may then be installed on the wheel simply by hooking them over the flange of the wheel rim and securing them in position by means of the set screw 73. The wheel will now be found to be correctly balanced and is ready for reinstallation on the vehicle upon inflating the tire.

In some instances, a selected amount of wheel unbalance may not be objectionable, and the disclosed tester enables ready testing of a wheel to determine whether the amount of wheel unbalance, if any, is above or below such selected amount. To enable such testing, the tester is calibrated as described and the wheel is then turned until its center of gravity is at its greatest distance from the vertical plane containing the horizontal axis of the tester. In this position, the amount of deflection of pointer 38 from normal is a direct indication of the actual inch ounces of unbalance of the wheel with respect to the horizontal axis.

The edges of ears 40 may be so proportioned with respect to index 41 and calibrating index 42 as to indicate the limits of movement of pointers 38 for the selected permissible amount of wheel unbalance. If the selected amount of permissible wheel unbalance is, for example, 5 inch ounces, and bar 46 in imposing a 30 inch ounce unbalance on the system moves pointer 38 from righthand index 41 to index 42, then the edge of ear 40 may be located ⅙ of the distance from righthand index 41 to reference index 42 in order to indicate 5 inch ounces of wheel unbalance.

Thus in those instances where exact balancing is not necessary, the tester may be used to indicate whether or not the amount of wheel unbalance is within the arbitrary selected limits for satisfactory balancing.

Having described my invention and explained the principles thereof as embodied in certain procedures and mechanisms in accordance with the statutes, it will be understood that the same may be otherwise employed by those skilled in the art without departing from the spirit thereof. Therefore, it will be understood that I consider myself entitled to all such modifications and variations as rightfully fall within the scope of the appended claims.

I claim as my invention:

1. The method of determining the amount of unbalance of a wheel by means of a vertical pendulum type balance testing device comprising an arbor mounted for rotation about a horizontal axis and provided with means for rotatably mounting a wheel in axially centered position thereon above said axis, and means for adjusting the center of gravity of the resultant assembly; which consists in placing the wheel to be tested in position on such apparatus, rotating the wheel to a point such that the center of gravity thereof lies in a vertical plane inclusive of said axis, applying a known arbitrary weight to effect movement of the wheel and pendulum about said axis, and adjusting the center of gravity of the system to change such movement to a predetermined amount corresponding to the unbalancing effect of said known arbitrary weight, then rendering said weight ineffective, rotating said wheel one quarter turn, and comparing the amount of the resultant movement of the wheel and pendulum about said horizontal axis with said predetermined amount of movement.

2. In a wheel balance testing device, a supporting standard, a vertical shaft, means mounting said shaft for pivotal movement about a single horizontal axis, means for supporting a wheel above said mounting means for tilting movement as a unit with said shaft, a counterpoise adjustably mounted for movement along said shaft below said mounting means, pointer and scale means calibrated in terms of corrective weights and one of said pointer and scale means being shiftable by pivotal displacement of said vertical shaft, a radial index on said shaft, a calibrating member movably mounted on said shaft and extending radially thereof for adjustment angularly about said shaft and adapted to apply a measured unbalanced force to said shaft in units of said scale calibration, and indexes on said member for alignment with said shaft index.

3. In a wheel balance testing device, a supporting standard, a vertical shaft, means mounting said shaft for pivotal movement about a horizontal axis, means for supporting a wheel above said mounting means for tilting movement as a unit with said shaft, an indicator on said shaft, a reference index on said standard for alignment with said indicator in the vertical position of said shaft, a calibrating index spaced from said reference index, an unbalanced weight arm for application to said shaft, and a counterpoise adjustable vertically on said shaft to align said indicator with said calibrating index when said unbalanced weight arm is applied to said shaft and the wheel to be tested is in place on said supporting means.

4. In a wheel balance testing device, a supporting standard, a vertical shaft, means mounting said shaft on said standard for pivotal movement about a single horizontal axis, means for supporting a wheel above said mounting means in axial alignment with said shaft for tilting movement as a unit therewith, a counterpoise mounted on said shaft below said mounting means for adjustment axially of said shaft, a known calibrating weight pivotally mounted on said shaft and extending radially thereof for adjustment angularly about said shaft to create an arbitrary unbalancing force, and scale means associated with said shaft including a pair of indexes spaced apart a distance corresponding to the movement of said shaft when said arbitrary unbalancing force is applied by adjustment of said calibrating weight, and said counterpoise is adjusted in accordance with the weight distribution of the wheel being tested.

5. In a wheel balance testing device, a supporting standard, a vertical shaft, means mounting said shaft on said standard for pivotal movement about a single horizontal axis, means for supporting a wheel above said mounting means in axial alignment with said shaft and for tilting movement as a unit therewith, a counterpoise mounted on said shaft below said mounting means for adjustment axially of said shaft, a known calibrating weight movably mounted on said shaft and projecting outwardly therefrom to selectively apply an arbitrary unbalancing force thereto, and scale means associated with said shaft for indicating the deviation thereof from vertical to enable said shaft deviation to be uniformly adjusted for successive wheels tested, by adjustment of said counterpoise along said shaft.

6. In a wheel balance testing device, a supporting standard, a vertical shaft, means mounting said shaft on said standard for pivotal movement about a single horizontal axis, means for supporting a wheel above said mounting means in axial alignment with said shaft for tilting movement as a unit therewith, a counterpoise mounted on said shaft below said mounting means for adjustment axially of said shaft, a known calibrating weight means movably mounted on said shaft to apply selectively an arbitrary unbalancing force thereto, and scale means associated with said shaft including a pair of indexes spaced apart a distance corresponding to the unbalancing force applied by said calibrating weight means when said counterpoise is adjusted in accordance with the weight distribution of the wheel being tested.

7. The method of calibrating a pendulum type wheel balance tester to obtain uniform sensitivity with wheels of various sizes, shapes, and weights, and of determining the unbalance of a wheel thereon; which includes the steps of supporting the wheel to be tested in balanced position on the pendulum for oscillation therewith, applying a known arbitrary force to unbalance the pendulum and wheel system and effect movement thereof, redistributing the weight of the system so that the known arbitrary force effects oscillation of the pendulum and the wheel thereon for a given predetermined distance corresponding to the unbalancing effect of said known arbitrary force, then rendering said known arbitrary force ineffective, turning said wheel one quarter turn from balanced position, and comparing the amount of the resultant movement of the wheel and pendulum with said predetermined distance.

JAMES W. MORSE.